July 10, 1956  W. N. STOOPS ET AL  2,754,282
SHOCK-RESISTANT PLASTIC COMPOSITIONS
Filed Jan. 15, 1953

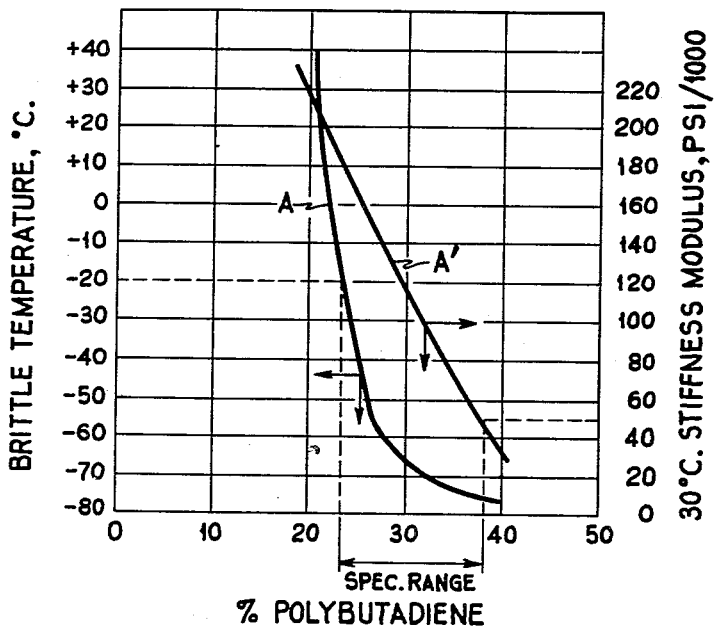

Fig. 1.

EFFECT OF POLYBUTADIENE CONTENT ON ROOM TEMPERATURE STIFFNESS AND LOW TEMPERATURE FLEXIBILITY OF STYRENE POLYMERIZED ON <60°C. POLYBUTADIENE.

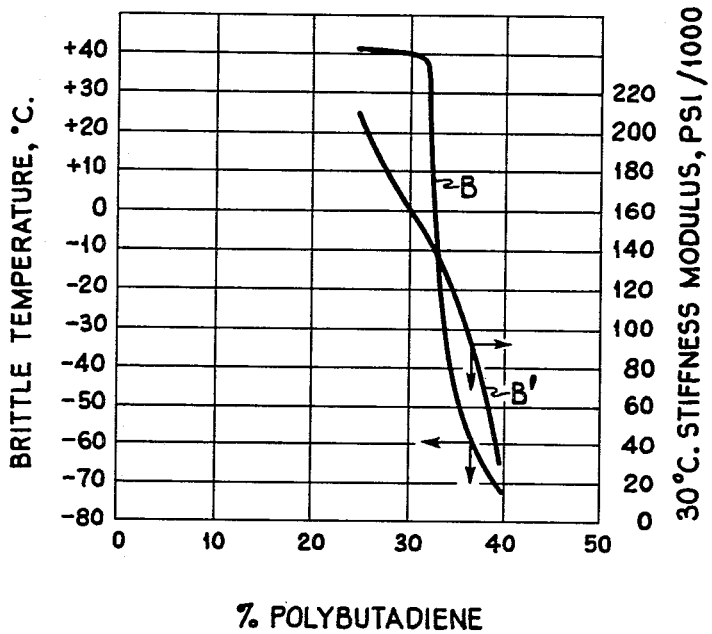

Fig. 2.

EFFECT OF POLYBUTADIENE CONTENT ON ROOM TEMPERATURE STIFFNESS AND LOW TEMPERATURE FLEXIBILTY OF STYRENE POLYMERIZED ON 90°C. POLYBUTADIENE.

INVENTORS
WILLIAM N. STOOPS
BERNARD A. PRICE
BY Louis C. Smith Jr.
ATTORNEY

United States Patent Office 2,754,282
Patented July 10, 1956

2,754,282

SHOCK-RESISTANT PLASTIC COMPOSITIONS

William N. Stoops, Charleston, and Bernard A. Price, South Charleston, W. Va., assignors to Union Carbide and Carbon Corporation, a corporation of New York Application January 15, 1953, Serial No. 331,438

1 Claim. (Cl. 260—45.5)

The physical properties of compositions based on thermoplastic resins are sharply dependent in general on the environmental temperature. Thus, such plastic compositions tend to become softer and more flexible as the temperature is increased and to become more rigid and brittle as the temperature is decreased. Thus, very few plastic compositions are capable of useful application over a wide range of temperatures. As a general rule, compositions which are adequately flexible and non-brittle at extremely low temperatures do not possess rigidity at room temperatures and above. Conversely, those compositions which are tough and rigid at room temperatures tend to be quite brittle at extremely low temperatures.

We have invented a plastic composition and a method of making it, which composition is tough and rigid at ordinary temperatures and which is free from brittleness at low temperatures. More specifically, our plastic composition has a brittle temperature below —20° C. and a stiffness modulus of elasticity at 30° C. of at least 50,000 p. s. i. In addition the plastic composition has unusually high impact strength and resistance to shattering, and these properties are retained at temperatures below —20° C.

The first step in the preparation of the plastic composition is to polymerize butadiene as essentially the sole monomer to a polybutadiene having a relatively high molecular weight. To achieve this, the polymerization of the butadiene is conducted in an aqueous emulsion in the presence of a polymerization catalyst and a temperature below 60° C. The next step in the preparation of the plastic composition is to polymerize styrene monomer in the presence of a specified amount of the polybutadiene. This second step may be termed "consecutive polymerization" and it is believed that a certain amount of the styrene becomes chemically combined as side chains on the polybutadiene base polymer. However, regardless of the validity of the theory, it has been established that the valuable combination of properties possessed by the new plastic composition is obtained only when the styrene is consecutively polymerized in the presence of the polybutadiene polymer; mere mechanical mixing of the polybutadiene with a styrene polymer giving products having high brittle points and inferior strength at low temperatures. Furthermore, it is essential to polymerize the styrene polymer in the presence of the previously formed polybutadiene; the reverse procedure in which the butadiene is polymerized in the presence of a previously formed styrene polymer giving inferior products.

One of the valuable characteristics of the present invention is that the valuable combination of properties of low brittle point and high stiffness modulus at 30° C. is obtained over a wide range of polybutadiene content, thus permitting a selection of optimum properties. In the drawing Figure 1, curve A shows how the brittle point of the composition varies with the polybutadiene content; and curve A' shows the corresponding variation in the stiffness modulus of elasticity. Thus, between a polybutadiene content of 23.5% and 38%, there may be obtained a wide range of compositions having physical properties varying from a brittle point of —20° C. and a stiffness modulus of about 180,000 p. s. i. to a brittle point of —75° C. and a stiffness modulus of 50,000 p. s. i.

In order to compare the products of this invention with those of the prior art, curves B and B' of Figure II show the variations in brittle point and stiffness modulus with polybutadiene content of a resin composition prepared by polymerizing styrene in the presence of various amounts of a polybutadiene rubber polymerized at 90° C. under the conditions described in U. S. Patent No. 2,460,300. It will be noted that the slope of the curves B' and B is extremely steep, indicating that minor variations in the polybutadiene content will have a pronounced effect on both the brittle point and stiffness modulus. Thus, the properties of the composition are very sensitive to changes in the polybutadiene content, and it would be very difficult to reproduce any given composition. Thus, the compositions would have a stiffness modulus above 50,000 p. s. i. and a brittle temperature below —20° C. over a very narrow range of polybutadiene content of 33.5% to 39%. Also, with the prior art compositions, it is impossible to produce compositions of very low brittle points around —70° C., and at the same time having a high stiffness modulus at 30° C. of around 100,000 p. s. i. Thus, the compositions of the present invention provide a much wider range of useful properties than do the products of the prior art.

Other prior art products are known in which styrene and acrylonitrile are copolymerized in the presence of rubber copolymers of butadiene and styrene. However these products as well as similar products in which styrene alone is polymerized on the same rubber, unlike those of the present invention, are brittle at low temperatures. Thus, the composition and properties of the polybutadiene component of the plastic composition are of great importance in obtaining the useful products of the present invention.

Thus, it is essential to use a polybutadiene which has been polymerized at a temperature below 60° C., for the reasons previously mentioned. Also, the lower the polymerization temperatures, the more suitable is the polybutadiene for making shock-resistant plastic compositions; polybutadiene rubber made at 10° C., for example, showing outstanding qualities. It is possible that the improved performance of this so-called "cold-rubber" is caused by a less highly branched structure. It is also important that the polybutadiene be of relatively high molecular weight, as low molecular weight polybutadienes result in consecutive copolymers which are lacking in strength. Thus, the specific viscosity (an indication of molecular weight) of the polybutadiene should be at least 0.3 as measured with solutions of 0.2 gram of the polymer in 100 ml. benzene at 30° C.

$$\left(\text{The specific viscosity is } \frac{\text{visc. solution}}{\text{visc. solvent}} - 1\right)$$

The higher molecular weight polybutadienes are not completely soluble in benzene, and thus specific viscosities as determined above, cannot be measured. However, such higher molecular weight polybutadienes can be used in the practice of the invention, but somewhat higher quantities are required to obtain consecutive copolymers of the same brittle point as obtained with the lower molecular weight polybutadienes. Such higher molecular weight polybutadienes may be characterized by having Mooney plasticity numbers of 80 and above.

As noted in the drawing, the polybutadiene content of the consecutive copolymer has a significant influence on the physical properties. Thus, in order to obtain compositions having brittle temperatures below —20° C. and a stiffness modulus of 30° C. above 50,000 p. s. i. it is essential that the polybutadiene content of the consecutive copolymer be within the range of 23.5% to 38% by weight. The effect of polymer composition on the physical properties of the consecutive copolymer is shown in the following table.

| Polymer Composition | | Brittle Temp., °C. | $T_4$ °C. | Stiffness Modulus, p. s. i. |
|---|---|---|---|---|
| Percent Polybutadiene | Percent Styrene | | | |
| 20 | 80 | >+40 | 101 | 210,000 |
| 25 | 75 | −56 | 101 | 165,000 |
| 30 | 70 | −60 | 94 | 115,000 |
| 35 | 65 | −78 | 78 | 70,000 |
| 40 | 60 | −74 | 51 | 30,000 |
| 1 32 | 68 | +8 | 90 | 135,000 |

1 For comparison, this run is GRS standard rubber in composition and polymerization conditions. 68 parts of styrene was polymerized with 32 parts of this rubber.

BRITTLE TEMPERATURE, ° C.

The brittle point of a plastic material is defined as the lowest permissible temperature at which a specimen may be bent at a specified rate of loading without breaking. A. S. T. M. test D746–44T.

$T_4$ TEMPERATURE, ° C.

This test determines the temperature at which the specimen under examination shows a stiffness modulus of 10,000 p. s. i. The procedures used are a modification of the A. S. T. M. test D1943–49T "Stiffness Properties of Nonrigid Plastics as a Function of Temperature by Means of a Torsional Test," in which the test machine weights and specimen thickness specifications have been altered to permit measurement of stiffness modulus in the range of 10,000 p. s. i. rather than the A. S. T. M. prescribed range of 135,000 p. s. i. Actually the weights used are adjusted to provide one-half the torsional force specified by the A. S. T. M. test and the specimen thickness specifications changed from 40 mils to 70 mils. The $T_4$ temperature defines approximately the upper temperature at which a semi-rigid plastic material retains appreciable strength.

STIFFNESS MODULUS AT 30° C., P. S. I.

This value is determined from the stiffness modulus-temperature curve obtained with the $T_4$ test procedure, above. The value provides a measure of the rigidity of the plastic materials at room temperature.

The last line in the above table indicates the importance of using polybutadiene substantially free of copolymerized styrene as a base for the consecutive copolymer. When a standard GRS type rubber (copolymer of 75% butadiene and 25% styrene) was substituted for the pure polybutadiene, the brittle temperature was +8° C. instead of −60° to −78° C.

As previously indicated, the preparation of the shock-resistant plastic compositions of this invention involves a fixed sequence of manufacture. The first step is the polymerization of butadiene to a polymer having the properties previously described. It is essential to conduct this polymerization at a temperature below 60° C., and in the form of an aqueous emulsion, but otherwise a wide variety of polymerization conditions can be used, as are known in the art. The usual free-radical type polymerization catalysts are employed, such as organic peroxides, alkali persulfates and diazoamino benzene. At low polymerization temperatures, the conventional redox recipes are useful.

In carrying out an emulsion polymerization, for example, an autoclave is purged of all air by water and nitrogen displacement procedures and the water, emulsifier, buffer, viscosity control agent and the reducing portion of the oxidation-reduction (redox) catalyst, if such is used, are charged to the autoclave. Next, the butadiene, modifiers and catalyst are added when the autoclave has been brought to polymerization temperature, which may be in the range from −40° C. to +60° C. The polymerization reaction is usually carried to about 75% conversion, and the unreacted butadiene stripped off.

The second essential polymerization step is the polymerization of the styrene in the presence of the previously polymerized polybutadiene. The charge for this reaction consists of the polybutadiene latex, obtained as above, water, styrene, emulsifying agent and water. The usual procedure is to add the catalyst after the charge has reached polymerization temperature, which is usually 50° C., but may vary from 30° C. to 90° C. The polymerization is carried out under nitrogen atmosphere and preferably carried to 100% conversion. If not, the unreacted monomer may be removed by steam distillation. After the addition of any of the conventional rubber antioxidants, such as di-tertiary butyl para-cresol or sym. di-beta-naphthyl-para-phenylene diamine, the copolymerized rubber-resin mixture is recovered by conventional precipitation procedures, using aqueous sodium chloride-sulfuric acid solutions, isopropanol-water mixtures or acetic acid-water mixtures. To control the rate of polymerization and provide thermal control of the reaction, the styrene may be added in increments.

The consecutive copolymers of this invention have impact strengths at room temperature (77° F.) of around 7 to 10 foot pounds per inch of notch (Izod) and about 5 to 9 foot pounds at temperatures as low as −20° F. The copolymers will not shatter when struck by a 10 pound steel ball dropped from a height of five feet, at temperatures as low as −40° F.

These properties may be contrasted to those of the known semi-rigid products designed for high impact resistance, which possess this property at temperatures above 32° F., but are not shatter-resistant at lower temperatures. These known semi-rigid materials are prepared from mechanical mixtures of synthetic rubber with various resins, such as styrene-butadiene rubber or acrylonitrile-butadiene rubber mixed with polystyrene or styrene-acrylonitrile copolymers.

It will be seen that the consecutive copolymer has equivalent strength and toughness at room temperature to commercial semi-rigid plastics, but is to be distinguished therefrom by its flexibility and impact strength at low temperatures. This is unique in the field of plastics. For further comparison, plasticized vinyl film is well known on the market for a variety of uses, yet even with specially prepared plasticizers, the brittle points of such film are in the range of −55° C. to −60° C. To obtain such low temperature flexibility in plasticized vinyl film, however, the degree of plasticization is such that the product is very flexible and rubber-like at room temperature, having a flexural modulus of about 1000 p. s. i. Thus, it is seen that the present product is characterized by being tough and semi-rigid at room temperature, equivalent to commercial products in its properties at room temperature, and yet is as flexible at low temperatures as highly plasticized vinyl film. Stated in other words, therefore, the change in physical properties with changes in temperatures of the new consecutive copolymers is much less than the change which occurs with known thermoplastic compositions.

The following examples will further serve to characterize the invention:

Example 1

A glass lined autoclave maintained at a temperature of 20° C. was charged with the following ingredients:

|  | Parts |
|---|---|
| Water | 185 |
| Butadiene | 100 |
| Technical sodium oleate | 5 |
| Cumene hydroperoxide | 0.32 |
| Tetraethylenepentamine | 0.22 |
| Potassium chloride | 0.8 |
| Potassium hydroxide | 0.4 |

The polymerization reaction was stopped after 7.5 hours operation by which time 51% of the monomer had been converted to polymer. After stripping off unreacted butadiene, a benzene-insoluble elastomer was obtained.

A glass pressure bottle was charged with 93 grams of the above described rubber latex which contained 20 grams of polybutadiene. To this latex was added 40 grams of monomeric styrene, 38 grams of water and 0.5 grams of potassium persulfate. The pressure bottle was then turned end-over-end at 12 R. P. M. in a constant temperature bath maintained at 50° C. At the end of 17 hours, 98% of the styrene had been converted to polymer and the resin was recovered by conventional precipitation means after the addition of about 1.0% (by weight based upon the contained polybutadiene) of an antioxidant.

The vacuum dried consecutively copolymerized product, which contained 34% elastomer, showed a brittle-point temperature of −64° C., $T_4$ temperature of 88° C. and a 30° C. stiffness modulus of 139,000 p. s. i.

Example 2

A glass lined autoclave was charged with the following ingredients:

|  | Parts |
|---|---|
| Water | 182 |
| Butadiene | 100 |
| Technical sodium oleate (emulsifier) | 5 |
| Tertiary hexadecyl mercaptan (polymer viscosity control agent) | 0.75 |
| Cumene hydroperoxide (catalyst) | 0.56 |
| Tetraethylenepentamine (catalyst accelerator) | 0.2 |
| Diethylenetriamine (catalyst accelerator) | 0.2 |
| Potassium chloride (autoclave solution viscosity control agent) | 0.75 |
| Potassium hydroxide (pH control agent) | 0.13 |
| 2-Ethylhexanol (antifoam agent) | 0.75 |
| Benzene | 2.5 |

The above formula is but one example of a "cold-rubber" recipe and others known to the art are also useful. For example, other emulsifying agents, such as potassium oleate or the potassium salt of hydrogenated tallow acids may be used. Other polymer viscosity control agents include t-dodecyl mercaptan, primary dodecyl mercaptan or mixed tertiary higher alkyl mercaptans. Other free-radical type polymerization catalysts include organic and inorganic peroxides, such as diisopropyl benzene hydroperoxide.

The catalyst accelerators may be used either singly or combined. Tetraethylene pentamine, when used alone, yields a fast initial polymerization rate which thereafter decreases. Diethylene triamine, when used alone, yields a slow initial rate which thereafter increases. A combination of the two will yield an over-all constant rate. Also, periodically feeding fresh tetraethylene pentamine to the polymerization mixture will also yield an approximately constant rate.

The anti-foaming agent may be omitted until polymerization is complete and introduced prior to removal of unused monomer. Other anti-foaming agents may be substituted such as tetradecanol or other long chain alcohols.

In place of potassium chloride, other potassium salts or methanol can be used to prevent an undue rise in the viscosity of the autoclave charge. In place of potassium hydroxide, other pH control agents can be used to adjust the pH, such as sodium hydroxide or sodium or potassium carbonate.

A polymerization temperature of 10° C. was maintained for 15 hours at which time the reaction was terminated at a total conversion of 79%. The elastomer showed a specific viscosity at 30° C. of 0.998 as measured with a solution of 0.1 gram of elastomer dissolved in 50 ml. benzene.

To 30 parts of this elastomer in latex form were added 70 parts of monomeric styrene, 0.5 part potassium persulfate as catalyst, 0.5 part of technical sodium oleate and sufficient water to make a total of 300 parts. A polymerization temperature of 50° C. was maintained for 2 hours at which time all the monomeric styrene had been converted into polymer. A small quantity of antioxidant was added to the latex and the resin was then recovered using conventional procedures. The composition contained 30% polybutadiene.

The recovered product showed a brittle-point temperature of −60° C., a $T_4$ temperature of 94° C., 30° C. stiffness modulus of 116,000 p. s. i. and Izod impact values as follows:

| Test Temperature, °F | Impact Strength, Ft. Lbs. Per Inch of Notch |
|---|---|
| 77 | 7.0 |
| 50 | 7.5 |
| 20 | 7.4 |
| 0 | 7.5 |
| −20 | 7.5 |

A 1/16 inch x 6-inch x 6-inch specimen placed over a circular aperture five inches in diameter failed to crack under repeated blows with a 2-pound hammer.

Example 3

A glass-lined autoclave of 25-gallons capacity was charged with the same proportion of ingredients detailed for the butadiene polymerization in Example 2. The polymerization temperature was varied between 10° C. and 13° C. for a total of 14 hours at which time 75% of the butadiene had been converted to polymer which showed a specific viscosity at 30° C. of 0.78.

To 35 parts of this elastomer in latex form were added 65 parts of monomeric styrene, 0.5 part of potassium persulfate, 0.1 part tertiary hexadecyl mercaptan and 0.5 part of technical sodium oleate. A polymerization temperature of 50° C. was maintained for 3 hours at which time the reaction was stopped with 97.5% of the monomeric styrene having been converted to polymer. Antioxidant was added to the latex and the resin was recovered using conventional procedures. The product contained 35.6% of elastomer and showed a brittle-point temperature of −78° C., a $T_4$ temperature of 78° C., a 30° C. stiffness modulus of 72,000 p. s. i. and impact values as follows:

| Test Temperature, °F. | Impact Strength, Foot Pounds Per Inch of Notch |
|---|---|
| 77 | 6.3 |
| 50 | 6.8 |
| 20 | 6.4 |
| 0 | 7.2 |
| −20 | 7.4 |

Example 4

To 25 parts of the rubber in latex form obtained from Example 3 were added 75 parts of monomeric styrene, 0.5 part of potassium persulfate, 0.1 part of tertiary hexadecyl mercaptan and 0.5 part technical sodium oleate. The polymerization reaction was maintained at 50° C. for 2 hours by which time 96% of the monomer had been converted to polymer. The recovered product which contained 25.8% elastomer showed a brittle-point temperature of −56° C., a $T_4$ temperature of 101° C., 30° C. stiffness modulus of 166,000 p. s. i. and impact values as follows:

| Test Temperature, °F. | Impact Strength, Foot Pounds Per Inch of Notch |
|---|---|
| 77 | 7.0 |
| 50 | 6.7 |
| 20 | 6.7 |
| 0 | 6.6 |
| −20 | 6.6 |

*Example 5*

A glass-lined autoclave maintained at 10° C. was charged with the following ingredients:

| | Parts |
|---|---|
| Water | 182 |
| Butadiene | 100 |
| Tertiary hexadecyl mercaptan | 0.75 |
| Technical sodium oleate | 0.5 |
| Potassium hydroxide | 0.75 |
| 2-ethylhexanol | 0.75 |
| Benzene | 2.4 |

The catalyst consisting of cumene hydroperoxide (0.75 part), tetraethylenepentamine (0.29 part), and diethylenetriamine (0.29 part), was divided into four equal parts. One portion of the catalyst was charged to the autoclave initially and the remaining portions were charged at 5 hours intervals thereafter. At the end of 20 hours operation 76% of the monomer had been converted into polymer. The polymer was 58% soluble in benzene.

To 30 parts of this polybutadiene in latex form was added 70 parts of monomeric styrene, sufficient water to make 400 parts, 0.5 part of technical sodium oleate, 0.5 part of potassium persulfate and 0.1 part of tertiary hexadecyl mercaptan. A polymerization temperature of 50° C. was maintained for 5 hours by which time essentially 100% of the styrene had been converted into polymer. The recovered product, containing 30% of the elastomer, showed a brittle-point temperature of −30° C., T₄ temperature of 89° C., a 30° C. stiffness modulus of 128,000 p. s. i. and Izod impact values as follows:

| Test Temperature, °F. | Impact Strength, Foot Pounds Per Inch of Notch |
|---|---|
| 77 | 7.4 |
| 50 | 6.8 |
| 20 | 8.7 |
| 0 | 9.6 |
| −20 | 9.1 |

*Examples 6 and 7*

In contrast to the examples given above which illustrate the methods used in obtaining the products of our invention which show excellent low-temperature properties, these two examples describe the polymerization of the prior art products described in U. S. Patent No. 2,460,300, and their physical properties.

A glass-lined autoclave was charged with the following ingredients:

| | Parts |
|---|---|
| Water | 530 |
| Butadiene | 100 |
| "Nopco" 1216 (sulfated oil emulsifier) | 5.3 |
| Hydrogen peroxide | 1.2 |
| Ferric nitrate | 0.007 |
| Nitric acid | 0.35 |

A polymerization temperature of 90° C. was maintained for 22 hours by which time virtually all the monomer had been converted to polymer.

To 25 parts of this rubber in emulsion form was added 75 parts of styrene, sufficient water to make 375 parts, 0.375 part hydrogen peroxide, 0.001 part ferric nitrate and sufficient nitric acid to adjust the pH to 2.0. A polymerization temperature of 90° C. was maintained for 2 hours by which time 93% of the monomer was converted to polymer. The recovered polymer was vacuum dried and contained 26.4% elastomer.

In a similar manner a product (Example 7) was obtained which contained 32.2% elastomer.

Physical property data are present in the table below.

| Example | Brittle-point Temp., °C. | T₄ Temp., °C. | 30° C. Stiff. Mod., p. s. i. | Izod Impact, Ft. Lbs/Inch Notch | | | | |
|---|---|---|---|---|---|---|---|---|
| | | | | 77° F. | 50° F. | 20° F. | 0° F. | −20° F. |
| 6 | >+40 | 97 | 210,000 | 0.25 | 0.30 | 0.25 | 0.19 | 0.19 |
| 7 | >+40 | 92 | 165,000 | 0.71 | 0.69 | 0.75 | 0.55 | 0.44 |

From a comparison of the product of Example 4 which has a stiffness modulus of 166,000 p. s. i., with the prior art product of Example 7, which also shows a stiffness modulus of 165,000 p. s. i. it is apparent that on a basis of equal stiffness, the material of our invention is superior to the prior art product in impact strength and toughness (lack of brittleness) over a wide range of temperatures.

What is claimed is:

Process for making synthetic resins which comprises emulsifying butadiene as essentially the sole monomeric material in water containing an emulsifying agent and a free-radical type polymerization catalyst, polymerizing the butadiene at a temperature below about 60° C. to form a polymer having a specific viscosity above about 0.3, adding monomeric styrene to the polymeric latex thus formed, and polymerizing the styrene in the presence of the butadiene polymer to form a synthetic resin having as its ultimate composition from 23.5% to 38% by weight of butadiene, and from 62% to 76.5% by weight of styrene, said synthetic resin having a brittle temperature below −20° C. and a stiffness modulus at 30° C. of at least 50,000 p. s. i.

References Cited in the file of this patent

UNITED STATES PATENTS 2,460,300     Le Fevre et al.     Feb. 1, 1949